United States Patent
Fujii et al.

(10) Patent No.: US 8,816,664 B2
(45) Date of Patent: Aug. 26, 2014

(54) POWER SUPPLY UNIT

(75) Inventors: Masanori Fujii, Kyoto (JP); Tomoyuki Ito, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 356 days.

(21) Appl. No.: 13/250,177

(22) Filed: Sep. 30, 2011

(65) Prior Publication Data

US 2012/0081096 A1   Apr. 5, 2012

(30) Foreign Application Priority Data

Oct. 4, 2010   (JP) .................. 2010-224925

(51) Int. Cl.
- G05F 1/00 (2006.01)
- G06F 1/26 (2006.01)
- H02M 3/156 (2006.01)

(52) U.S. Cl.
CPC ............... H02M 3/156 (2013.01); G06F 1/266 (2013.01)
USPC .......................................................... 323/285

(58) Field of Classification Search
USPC ......... 323/222, 224, 271, 282, 283, 284, 285, 323/286, 318, 322; 713/300, 310, 320
See application file for complete search history.

(56) References Cited

U.S. PATENT DOCUMENTS

| | | | |
|---|---|---|---|
| 5,912,552 A * | 6/1999 | Tateishi | 323/285 |
| 7,233,873 B2 * | 6/2007 | Moriarty et al. | 702/94 |
| 2013/0024702 A1 * | 1/2013 | Chueh et al. | 713/300 |

FOREIGN PATENT DOCUMENTS

JP   10-225105   8/1998

* cited by examiner

*Primary Examiner* — Adolf Berhane
*Assistant Examiner* — Afework Demisse
(74) *Attorney, Agent, or Firm* — Hamre, Schumann, Mueller & Larson, P.C.

(57) ABSTRACT

A power supply unit, which is mounted in a host device for supplying power to a client device through a cable interposed therebetween, includes an output unit configured to generate a first output voltage from an input voltage. A controller is provided in the power supply to perform voltage feedback control on the output unit such that the first output voltage is maintained at a predetermined target value. Also, the power supply unit includes a first correction unit configured to correct the voltage feedback control at the controller such that the first output voltage is increased as a second output voltage finally supplied to the client device becomes lower, and a second correction unit configured to correct the voltage feedback control at the controller such that the first output voltage is increased as an output current supplied from the host device to the client device becomes larger.

16 Claims, 6 Drawing Sheets

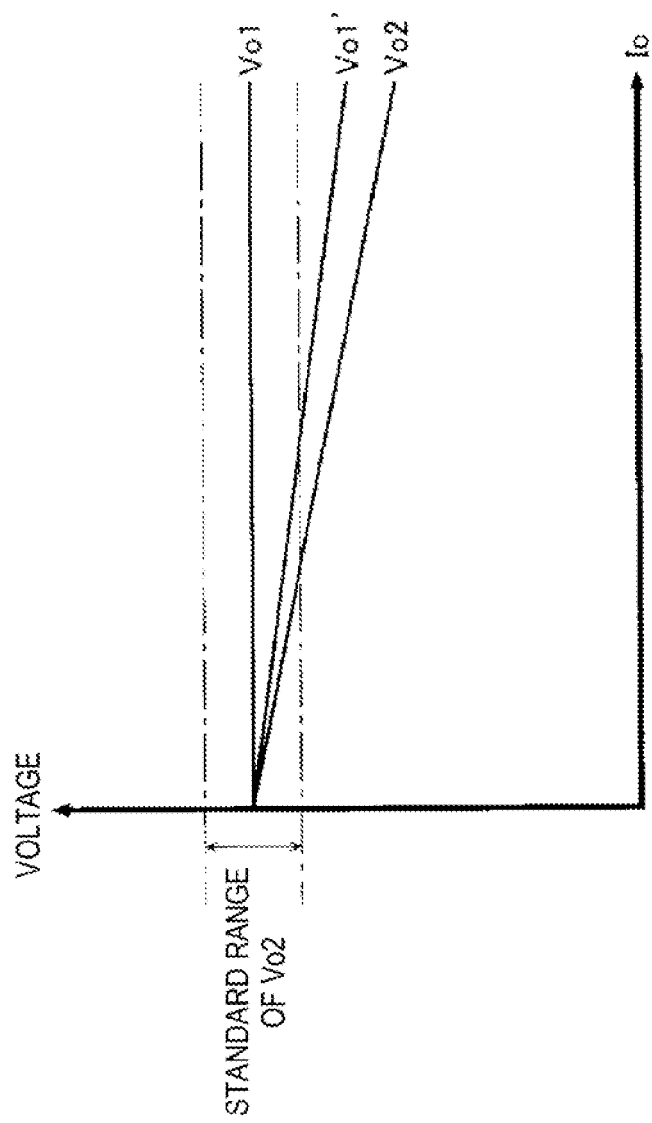

POWER SUPPLY UNIT

CROSS-REFERENCE TO RELATED APPLICATION

This application is based upon and claims the benefit of priority from Japanese Patent Application No. 2010-224925, filed on Oct. 4, 2010, the entire contents of which are incorporated herein by reference.

TECHNICAL FIELD

The present disclosure relates to a power supply unit mounted in a host device for supplying power to a client device connected to the host device through a cable.

BACKGROUND

FIG. 5 is a block diagram showing an exemplary power supply unit 100 of the related art. The power supply unit 101 is mounted in a host device 100 implemented according to the Universal Serial Bus (USB) standard, and supplies power to a client device 300 by using a cable 200 interposed therebetween. In addition to the power supply unit 101, the host device 100 includes a protective switch 103 configured to connect/disconnect a power supply line from the host device 100 to the client device 300, and a microcomputer 102 configured to control an ON/OFF operation of the protective switch 103.

This type of power supply unit is disclosed in, for example, Japanese Patent Laid-Open Publication No. 1-110-225105.

In the power supply unit 101 according to the related art, in order to maintain an output voltage Vo1 (which is an output voltage obtained from an upper stream side, i.e., power supply unit 101 side of the protective switch 103) output from the power supply unit 101, at a predetermined target value, a voltage feedback control operation is performed. However, in the voltage feedback control operation, neither an output voltage Vo1' (which is an output voltage obtained from a lower stream side, i.e., cable 200 side of the protective switch 103) output from the host device 100 nor an output voltage Vo2 eventually supplied to the client device 300 is considered.

Thus, in the power supply unit 101 according to the related art, when an output current Io supplied to the client device 300 from the host device 100 is increased, a voltage drop (Io× Ron) generated from an ON resistor Ron of the protective switch 103 and a voltage drop (Io×Rim) generated from a wiring resistor Rim of the cable 200 are increased. In addition, the output voltage Vo2(Vo1−Io×(Ron+Rim)) finally supplied to the client device 300 falls below a lower limit value of a USB standard range (see FIG. 6).

SUMMARY

In light of the foregoing problems discovered by the inventors of the present application, the present disclosure provides some embodiments of a power supply unit capable of maintaining an output voltage finally supplied to a client device from a host device, within a predetermined standard range, without depending on the amount of an output current supplied from the host device to the client device.

According to one embodiment of the present disclosure, a power supply unit, which is mounted in a host device for supplying power to a client device through a cable interposed therebetween, includes an output unit configured to generate a first output voltage from an input voltage. The power supply unit also includes a controller configured to perform voltage feedback control on the output unit such that the first output voltage is maintained at a predetermined target value. Further, in the power supply unit, a first correction unit is provided to correct the voltage feedback control at the controller such that the first output voltage is increased as a second output voltage finally supplied to the client device gets lower, and a second correction unit configured to correct the voltage feedback control at the controller such that the first output voltage is increased as an output current supplied from the host device to the client device gets larger.

BRIEF DESCRIPTION OF THE DRAWINGS

FIG. 6 is an IV correlation diagram showing a relationship between an output current Io and output voltages Vo1 to Vo2 of the power supply unit shown in FIG. 5.

DETAILED DESCRIPTION

Figure 1:
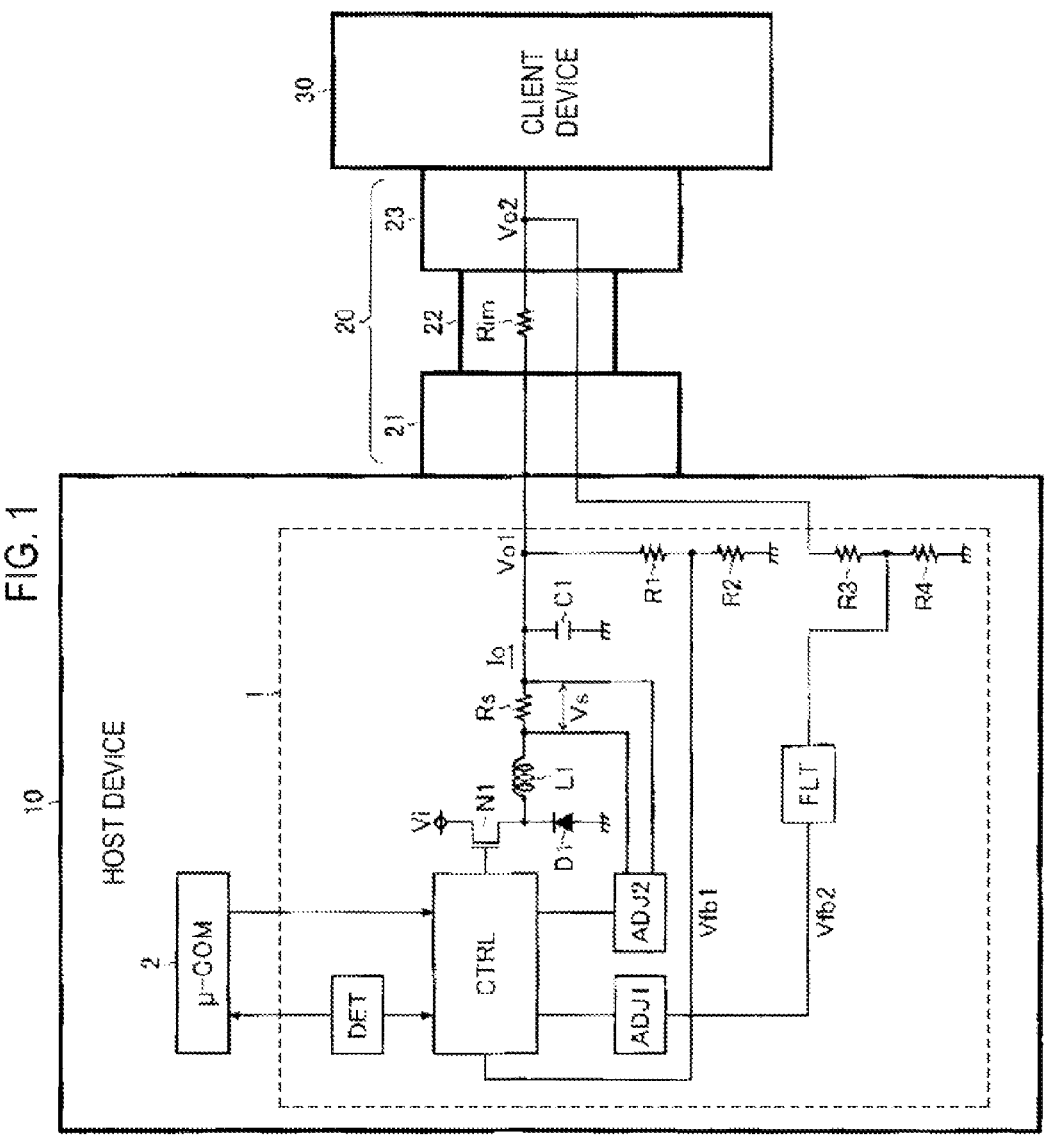
FIG. 1 is a block diagram showing an exemplary configuration of a power supply unit according to one embodiment of the present disclosure.

FIG. 1 is a block diagram showing an exemplary configuration of a power supply unit according to one embodiment of the present disclosure. In this exemplary configuration, a power supply unit 1 is mounted in a host device 10 and supplies power to a client device 30 by using a cable 20 interposed therebetween. The host device 10, the cable 20, and the client device 30 are all implemented and coupled in series according to the Universal Serial Bus (USB) standard. Also, the host device 10 includes a microcomputer 2 which controls the overall operations of the host device 10, in addition to the power supply device 1.

The power supply unit 1 includes an N channel type metal oxide semiconductor (MOS) field effect transistor N1, a diode D1, an inductor L1, a condenser C1, resistors R1 to R4, a sense resistor Rs, a switching controller CTRL, a first correction unit ADJ1, a second correction unit ADJ2, an error detection unit DET, and a filter unit FLT.

A drain of the transistor N1 is connected to an application terminal of an input voltage Vi. A source of the transistor N1 is connected to a cathode of the diode D1 and a first terminal of the inductor L1. A gate of the transistor N1 is connected to the switching controller CTRL. An anode of the diode D1 is connected to a ground terminal. A second terminal of the inductor L1 is connected to an application terminal of a first output voltage Vo1 through the sense resistor Rs interposed therebetween. A first terminal of the condenser C1 is connected to the application terminal of the first output voltage Vo1. A second terminal of the condenser C1 is connected to the ground terminal. A first terminal of the resistor R1 is connected to the application terminal of the first output voltage Vo1. A second terminal of the resistor R1 is connected to a first terminal of the resistor R2. A second terminal of the resistor R2 is connected to the ground terminal. A connection node of the resistor R1 and the resistor R2 is connected to the switching controller CTRL, as an application terminal of a first feedback voltage Vfb1. A first terminal of the resistor R3 is connected to an application terminal of a second output voltage Vo2. A second terminal of the resistor R3 is connected to a first terminal of the resistor R4. A second terminal of the resistor R4 is connected to the ground terminal. A connection node of the resistor R3 and the resistor R4 is connected to the first correction unit ADJ1, as an application terminal of a second feedback voltage Vfb2, through the filter unit FLT interposed therebetween. Both ends of the sensor resistor Rs are connected to the second correction unit ADJ2.

Also, an output unit for stepping down the input voltage Vi to generate the first output voltage Vo1 is formed by the transistor N1, the diode D1, the inductor L1, and the condenser C1. In other words, the output unit of the power supply unit 1 includes the output transistor N1 connected between the application terminal of the input voltage Vi and the output terminal of the first output voltage Vo1, and drives the output transistor N1 based on an instruction from the switching controller CTRL to step down the input voltage Vi to thereby generate the output voltage Vo1. However, the configuration of the output unit is not limited thereto and, for example, a P channel type MOS field effect transistor may be used as the output transistor, or a synchronous rectifying transistor may be used instead of the diode D1.

The switching controller CTRL performs a voltage feedback control on the output unit (N1, D1, L1, C1) such that the first output voltage Vo1 is consistent with a predetermined target value. More specifically, the switching controller CTRL monitors the first feedback voltage Vfb1 (which is a divided voltage of the first output voltage Vo1) drawn from the connection node of the resistor R1 and the resistor R2, and generates a gate signal of the transistor N1 to increase an ON duty (Ton/T, namely, the ratio of ON period Ton of the transistor N1 to a predetermined switching driving period T) of the transistor N1 when the first output voltage Vo1 is lower than the predetermined target value, and decrease the ON duty of the transistor N1 as the first output voltage Vo1 approaches the predetermined target value.

As used herein, the first output voltage Vo1 indicates an output voltage which is obtained from an upper stream side of the cable 20 (the connector 21 side close to the host device 10) and output from the power supply unit 1. Meanwhile, the second output voltage Vo2 indicates an output voltage which is obtained from a lower stream side of the cable 20 (the connector 23 side close to the client device 30) and finally supplied to the client device 30.

Since a cable main body 22 includes the wiring resistor Rim, the second output voltage Vo2 has a lower voltage value, by a voltage drop corresponding to the product of the output current Io supplied to the client device 30 from the host device 10 and the wiring resistor Rim of the cable main body 22, than the output voltage Vo1 (Vo2=Vo1−Io×Rim).

Thus, the power supply unit 1 according to the present embodiment includes the first correction unit ADJ1 and the second correction unit ADJ2 configured to correct the voltage feedback control at the switching controller CTRL, so as to supplement the voltage drop.

The first correction unit ADJ1 monitors the second feedback voltage Vfb2 (which is a divided voltage of the second output voltage Vo2) which is drawn from the connection node of the resistor R3 and the resistor R4 and input through the filter unit FLT, and corrects the voltage feedback control at the switching controller CTRL such that the first output voltage Vo1 is increased as the second output voltage Vo2 finally supplied to the client device 30 becomes lower.

Also, the second correction unit ADJ2 monitors a voltage Vs across the sensor resistor Rs and corrects the voltage feedback control at the switching controller CTRL such that the first output voltage Vo1 is increased as the output current Io supplied to the client device 30 from the host device 10 gets higher.

Figure 2:
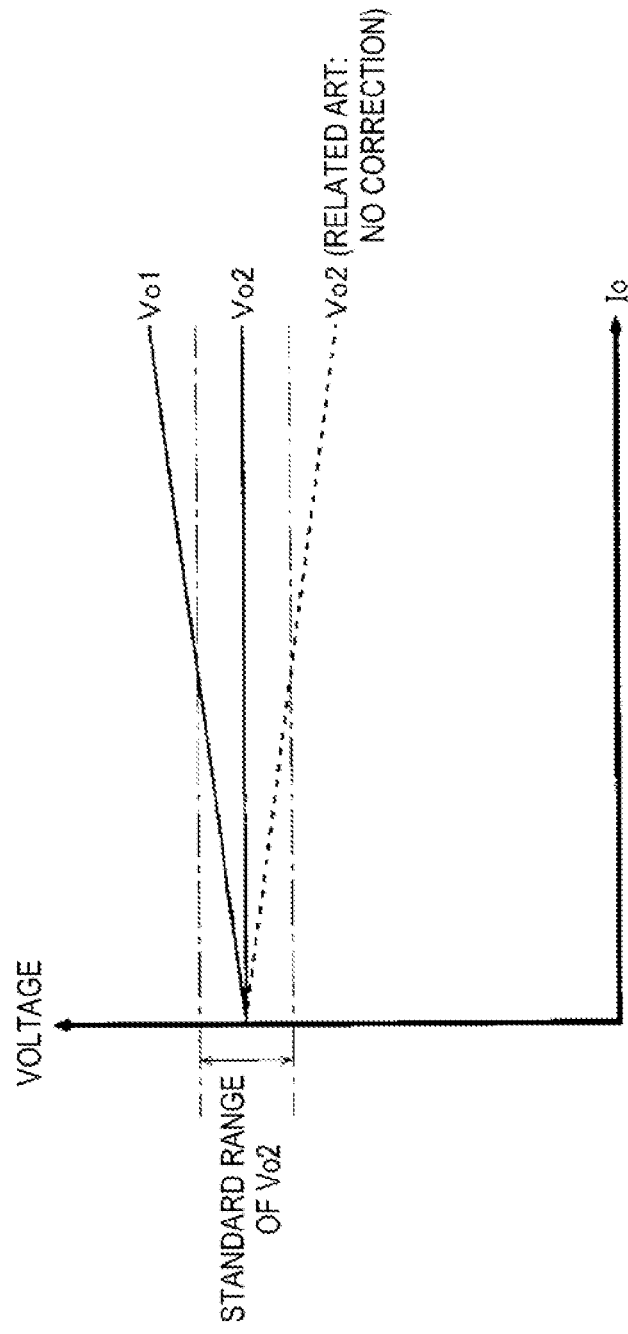
FIG. 2 is an IV correlation diagram showing a relationship between an output current Io and output voltages Vo1 and Vo2.

In this manner, the power supply unit 1 including the first correction unit ADJ1 and the second correction unit ADJ2 can appropriately supplement the voltage drop (Io×Rim) generated from the wiring resistor Rim of the cable 20, so that the second output voltage Vo2 finally supplied to the client device 30 can be maintained to be within a predetermined USB standard range, without depending on the amount of the output current Io supplied from the host device 10 to the client device 30 (see FIG. 2).

Figure 5:
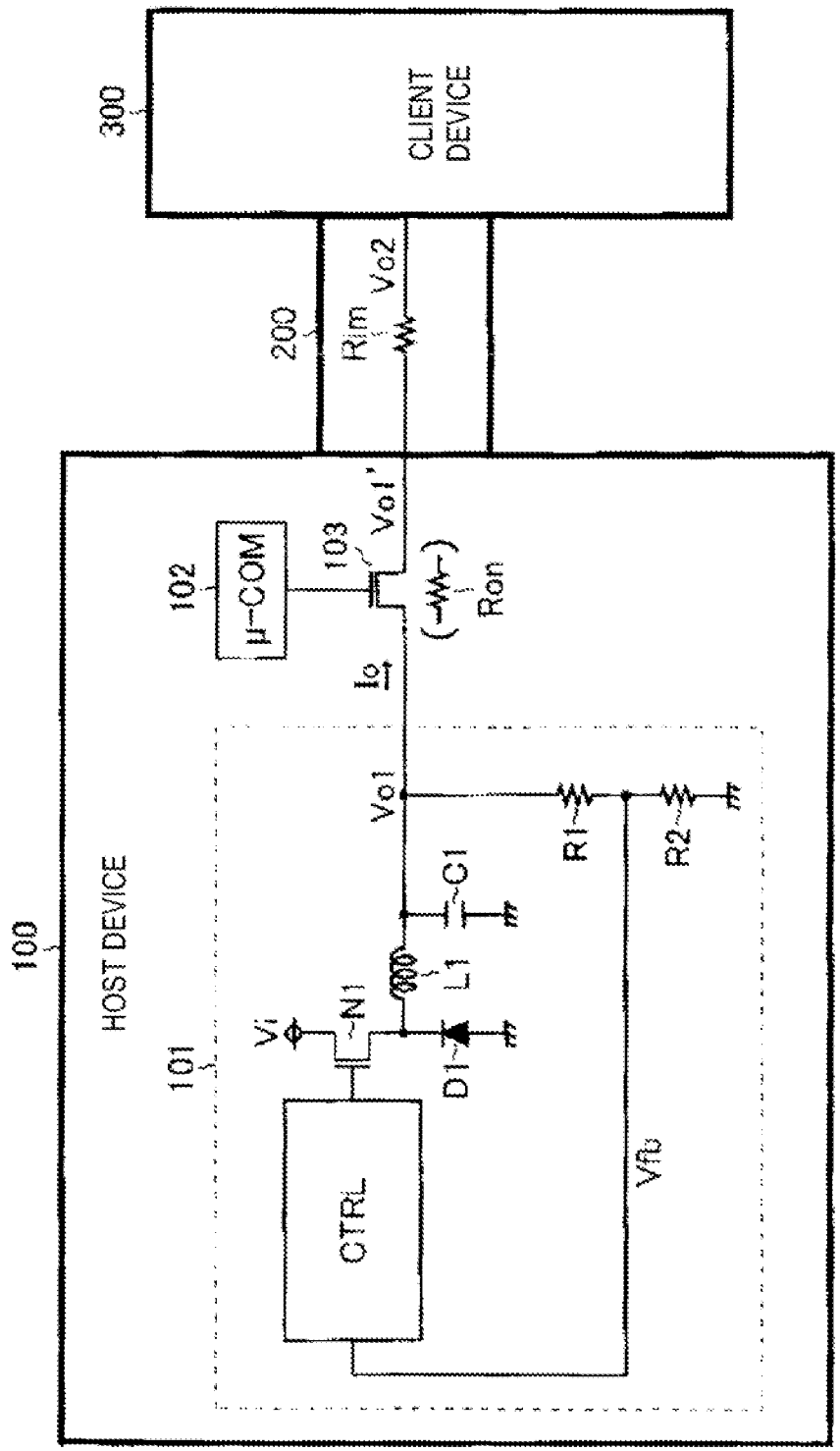
FIG. 5 is a block diagram showing a related art example of a power supply unit.

In the configuration in which only the voltage feedback control is performed based on the second output voltage Vo2, tolerance to responsiveness or noise with respect to a load change is insufficient. Also, in the configuration in which only the current feedback control is performed based on the output current Io, the second output voltage Vo2 is not considered, similar to the power supply unit of the related art in FIG. 5. Thus, in order to realize high responsiveness with respect to the load change and maintain the second output voltage Vo2 reliably within the USB standard range, it may be preferred in some embodiments to employ a configuration in which the voltage feedback control based on the first output voltage Vo1 is performed along a central axis and then corrections are independently performed on the voltage feedback control based on the respective monitoring results of the second output voltage Vo2 and the output current Io.

In addition, the power supply unit 1 according to the present embodiment further includes the filter unit FLT configured to remove a noise component from the second feedback voltage Vfb2 and output the same to the first correction unit ADJ1. With such a configuration, even when a noise component overlaps with the second output voltage Vo2 (and the second feedback voltage Vfb2 generated by dividing the second output voltage Vo2) returned to the host device 10 from the client device 30 through the cable 20 interposed therebetween, the noise component can be appropriately removed, so correction precision at the first correction unit ADJ1 can be enhanced.

Further, the power supply unit 1 according to the present embodiment may include the error detection unit DET configured to detect an error (overvoltage, reduced voltage, overcurrent, high temperature, or the like) of the power supply unit 1, generate an error detection signal, and output the generated error detection signal outside of the power supply unit 1 (to microcomputer 2 in FIG. 1). With such a configuration, when the power supply unit 1 has a certain error, corresponding information can be provided to the microcomputer 2.

Also, in the power supply unit 1 according to the present embodiment, the switching controller CTRL is configured to forcibly turn off the output transistor N1 when an error protection signal is received from outside of the power supply unit 1 (from microcomputer 2 in FIG. 1). With such a configuration, the protective switch 103 which was required in the related art example of FIG. 5 can be eliminated, and thus, the voltage drop (Io×Ron) generated in the ON resistor Ron of the protective switch 103 can be resolved.

Furthermore, in the power supply unit 1 according to the present embodiment, the error detection unit DET is configured to output the error detection signal also to the switching controller CTRL, and the switching controller CTRL is configured to forcibly turn off the output transistor N1 even when the error detection signal is received from the error detection unit DET. With such a configuration, when the power supply unit 1 has a certain error, the operation of the power supply unit 1 can be quickly stopped without having to wait for an instruction from the microcomputer 2.

<First Configuration Example of First Correction Unit and Second Correction Unit>

Figure 3:
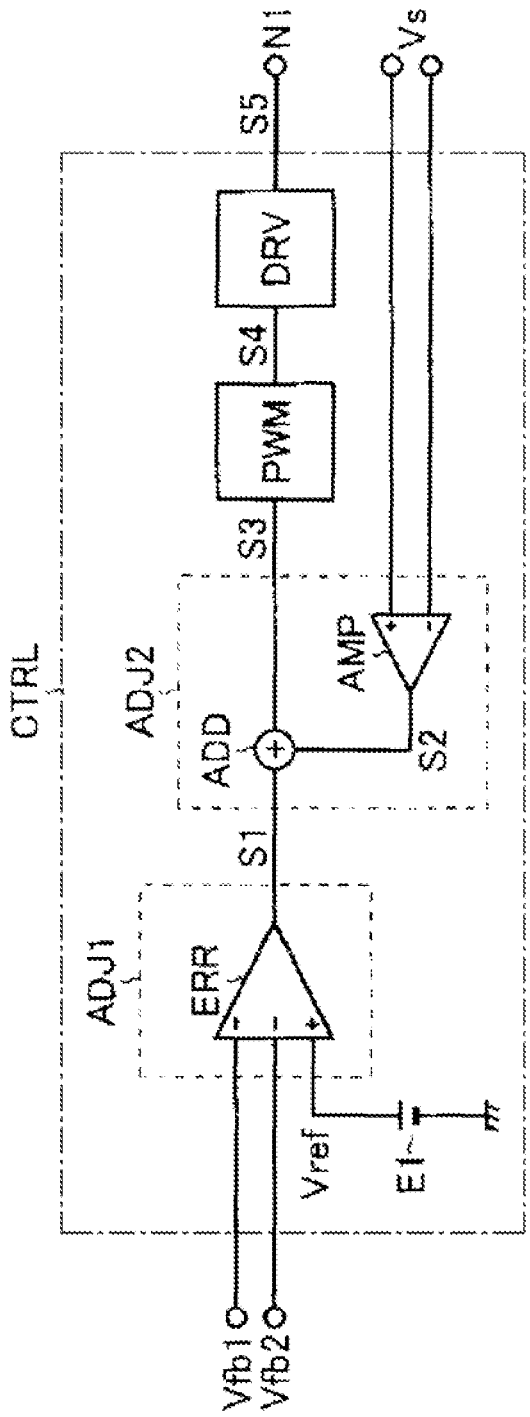
FIG. 3 is a block diagram showing a first exemplary configuration of a first correction unit ADJ1 and a second correction unit ADJ2.

FIG. 3 is a block diagram showing a first exemplary configuration of the first correction unit ADJ1 and the second correction unit ADJ2. In the first exemplary configuration, both the first correction unit ADJ1 and the second correction unit ADJ2 are included in the switching controller CTRL.

The switching controller CTRL includes an error amplifier ERR, a reference voltage generation unit E1, a pulse width modulation signal generation unit PWM, a driver DRV, an operational amplifier AMP, and an adder ADD. A non-inverting input terminal (+) of the error amplifier ERR is connected to an application terminal (a positive electrode terminal of the reference voltage generation unit E1) of a reference voltage Vref. A first inverting input terminal (−) of the error amplifier ERR is connected to an application terminal of the first feedback voltage Vfb1. A second inverting input terminal (−) of the error amplifier ERR is connected to an application terminal of the second feedback voltage Vfb2. An output terminal of the error amplifier ERR is connected to a first input terminal of the adder ADD. A non-inverting input terminal (+) of the operational amplifier AMP is connected to a high potential terminal (one end at the inductor L1 side) of the sense resistor Rs. An inverting input terminal (−) of the operational amplifier AMP is connected to a low potential terminal (the other end at the condenser C1 side) of the sensor resistor Rs. An output terminal of the operational amplifier AMP is connected to a second input terminal of the adder ADD. An output terminal of the adder ADD is connected to the pulse width modulation signal generation unit PWM.

The error amplifier ERR amplifies a difference between a lower value of the first and second feedback voltages Vfb1 and Vbf2, and the reference voltage Vref to generate an error signal S1. In other words, the first correction unit ADJ1 is configured with the error amplifier ERR, and the second feedback voltage Vfb2, instead of the first feedback voltage Vfb1, is input to an amplification terminal of the error amplifier ERR when the second feedback voltage Vfb2 is lower than the first feedback voltage Vfb1. With such a configuration, when the second output voltage Vo2 is lower than the first output voltage Vo1, a greater error signal S1 is generated to make the second output voltage Vo2 consistent with the reference voltage Vref, so the first output voltage Vo1 can be raised and the voltage drop (Io×Rim) generated from the wiring resistor Rim of the cable 20 can be appropriately supplemented.

The operational amplifier AMP amplifies the voltage Vs (which is a voltage dependent on the output current Io) across the sensor resistor Rs to generate a correction signal S2, and outputs the correction signal S2 to the adder ADD. The adder ADD adds the correction signal S2 and the error signal S1 to generate an added signal S3, and outputs the added signal S3 to the pulse width modulation signal generation unit PWM. Namely, the second correction unit ADJ2 is formed by the operational amplifier AMP and the adder ADD, and serves to increase the error signal S1 as the output current Io is increased. With such a configuration, since the added signal S3 (=S1+S2) input to the pulse width modulation signal generation unit PWM is increased as the output current Io is increased, the first output voltage Vo1 can be increased. And the voltage drop (Io×Rim) generated from the wiring resistor Rim of the cable 20 can be appropriately supplemented.

The pulse width modulation signal generation unit PWM compares the added signal S3 and a predetermined slope signal to generate a pulse width modulation signal S4, and then outputs the pulse width modulation signal S4 to the driver DRV. Meanwhile, as the added signal S3(=S1+S2) gets larger, a high level period Ton occupied in the switching driving period T of the pulse width modulation signal S4, i.e., ON duty (Ton/T) of the transistor N1, is increased.

The driver DRV generates a gate signal S5 of the transistor N1 based on the pulse width modulation signal S4, and drives an ON/OFF operation of the transistor N1.

In this manner, in the switching controller CTRL of the present exemplary configuration, a control signal generation unit is formed by the pulse width modulation signal generation unit PWM and the driver DRV to generate a gate signal S5 of the transistor N1 such that the error signal S1 is reduced.

<Second Configuration Example of First Correction Unit and Second Correction Unit>

Figure 4:
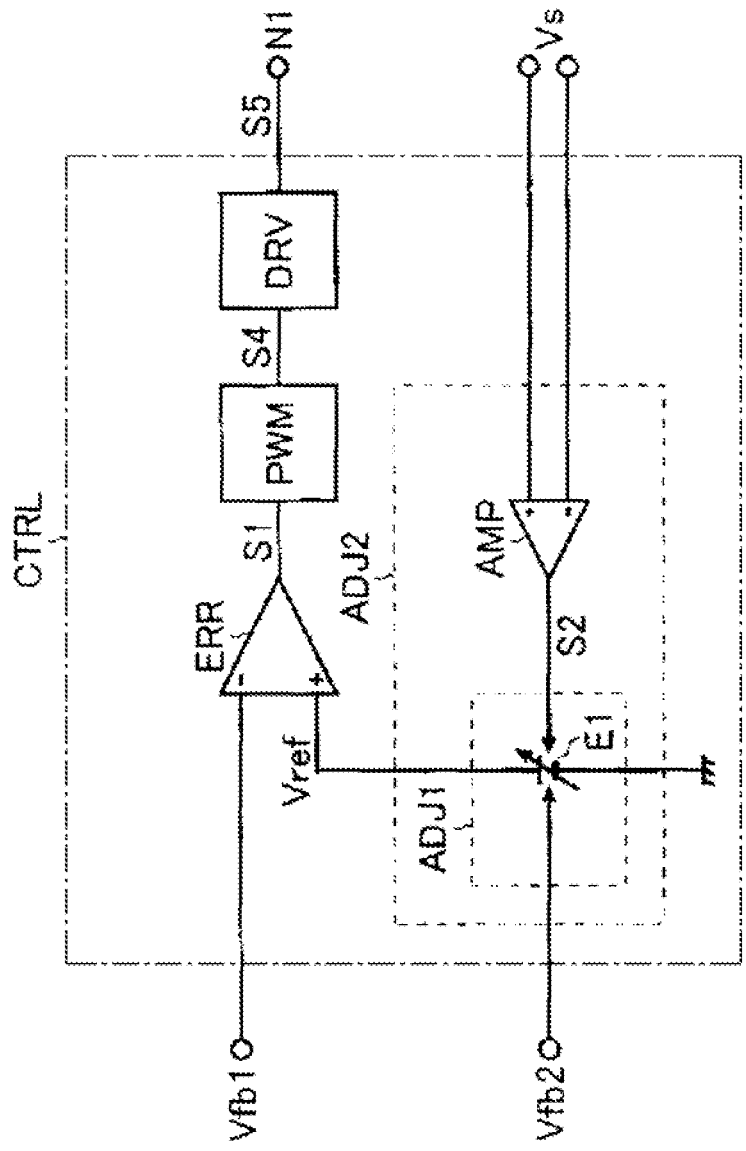
FIG. 4 is a block diagram showing a second exemplary configuration of the first correction unit ADJ1 and the second correction unit ADJ2.

FIG. 4 is a block diagram showing a second exemplary configuration of the first correction unit ADJ1 and the second correction unit ADJ2. Also, in the second exemplary configuration, the first correction unit ADJ1 and the second correction unit ADJ2 are included in the switching controller CTRL.

The switching controller CTRL includes the error amplifier ERR, the reference voltage generation unit E1, the pulse width modulation signal generation unit PWM, the driver DRV, and the operational amplifier AMP. Compared with the foregoing first exemplary configuration, the adder ADD is excluded.

The non-inverting input terminal (+) of the error amplifier ERR is connected to the application terminal (a positive electrode terminal of the reference voltage generation unit E1) of the reference voltage Vref. An inverting input terminal (−) of the error amplifier ERR is connected to the application terminal of the first feedback voltage Vfb1. An output terminal (−) of the error amplifier ERR is connected to the pulse width modulation signal generation unit PWM. The non-inverting input terminal (+) of the operational amplifier AMP is connected to the high potential terminal (one end at the inductor L1 side) of the sense resistor Rs. The inverting input terminal (−) of the operational amplifier AMP is connected to the low potential terminal (the other end at the condenser C1 side) of the sensor resistor Rs. A voltage control terminal of the reference voltage generation unit E1 is connected to the application terminal of the second feedback voltage Vfb2 and the output terminal of the operational amplifier AMP.

The error amplifier ERR amplifies a difference between the first feedback voltage Vfb1 and the reference voltage Vref to generate an error signal S1. The pulse width modulation signal generation unit PWM compares the error signal S1 and a predetermined slope signal to generate a pulse width modulation signal S4 and outputs the pulse width modulation signal S4 to the driver DRV. Meanwhile, as the magnitude of the error signal S1 becomes larger, the high level period Ton occupied in the switching driving period T of the pulse width modulation signal S4, i.e., ON duty (Ton/T) of the transistor N1, is increased. The driver DRV generates a gate signal S5 of the transistor N1 based on the pulse width modulation signal S4, and drives an ON/OFF operation of the transistor N1.

The reference voltage generation unit E1 operates to increase the reference voltage Vref as the second feedback voltage Vref2 becomes lower. Namely, the first correction unit ADJ1 is included in the switching controller CTRL as a function of the reference voltage generation unit E1. With such a configuration, as the second output voltage Vo2 becomes lower, the reference voltage Vref is increased and the greater error signal S1 is generated, such that the first output voltage Vo1 can be raised up and the voltage drop (Io×Rim) generated from the wiring resistor Rim of the cable 20 can be appropriately supplemented.

The operational amplifier AMP amplifies the voltage Vs (which is a voltage depending on the output current Io) across the sensor resistor Rs to generate the correction signal S2, and outputs the correction signal S2 to the reference voltage generation unit E1. The reference voltage generation unit E1 operates to increase the reference voltage Vref as the correction signal S2 becomes larger. Namely, the second correction unit ADJ2 is formed by the operational amplifier AMP and the reference voltage generation unit E1 and serves to increase the reference voltage Vref and the error signal S1 as the output current Io becomes larger. With such a configuration, since the error signal S1 input to the pulse width modulation signal generation unit PWM is increased as the output current Io becomes larger, the first output voltage Vo1 can be increased and the voltage drop (Io×Rim) generated from the wiring resistor Rim of the cable 20 can be appropriately supplemented.

<Other Modifications>

In the above embodiments, the configurations which apply the present disclosure to the step-down power supply unit for generating a desired output voltage by stepping down an input voltage have been described by way of example, but the present disclosure is not limited thereto and can be widely applied to a step-up or step-up/step-down power supply unit.

Additionally, in the above embodiments, the configurations which apply the present disclosure to the switching regulator type power supply unit are described by way of example, but the present disclosure is not limited thereto and can be also widely applied to a series regulator type or charge pump type power supply unit.

Further, in the above embodiments, the configurations of monitoring the output current Io by using the sensor resistor Rs are described by way of example, but the present disclosure is not limited thereto and, for example, a configuration of monitoring a voltage drop in the transistor N1 may be employed.

The power supply unit according to the present disclosure can be appropriately used as a power supply unit which is mounted in a host device based on, for example, a USB standard and supplies power to a client device through a cable interposed therebetween.

According to the embodiments of the present disclosure, a power supply unit capable of maintaining an output voltage finally supplied to a client device from a host device, within a predetermined standard range, without depending on the amount of an output current supplied from the host device to the client device, is provided.

Also, the configuration of the embodiments provided in the present disclosure may be variably modified, within a scope which does not depart from the main purport of the present disclosure, in addition to the foregoing embodiments. In other words, the embodiments are illustrative in every aspect and considered not to be limited, and it is to be understood that the technical scope of the present disclosure is not defined by the description of the embodiments but by the scope of claims and include every modification belonging to the meanings and scope equivalent to the scope of claims.

What is claimed is:

1. A power supply unit mounted in a host device for supplying power to a client device through a cable interposed therebetween, the cable including a cable main body having a predetermined wiring resistor, a first connector configured to be connected to the host device, and a second connector configured to be connected to the client device, the power supply unit comprising:

an output unit configured to generate a first output voltage from an input voltage and to output the first output voltage to the first connector;

a controller configured to perform a voltage feedback control on the output unit such that the first output voltage is maintained at a predetermined target value;

a first correction unit configured to change the voltage feedback control at the controller such that the first output voltage is increased proportionally to a second output voltage finally supplied to the client device via the second connector as the second output voltage becomes lower; and a second correction unit configured to change the voltage feedback control at the controller such that the first output voltage is increased proportionally to an output current supplied from the host device to the client device as the output current becomes larger.

2. The power supply unit of claim 1, wherein the controller comprises:

an error amplifier configured to amplify a difference between a first feedback voltage depending on the first output voltage and a predetermined reference voltage to generate an error signal; and a control signal generation unit configured to generate a control signal of the output unit to decrease the error signal.

3. The power supply unit of claim 2, wherein when a second feedback voltage depending on the second output voltage is lower than the first feedback voltage, the first correction unit inputs the second feedback voltage, instead of the first feedback voltage, to an amplification terminal of the error amplifier.

4. The power supply unit of claim 3, further comprising a filter unit configured to remove a noise component from the second feedback voltage and output the same to the first correction unit.

5. The power supply unit of claim 2, wherein the first correction unit increases the reference voltage as the second feedback voltage depending on whether the second output voltage becomes lower.

6. The power supply unit of claim 2, wherein the second correction unit increases the error signal as the output current becomes larger.

7. The power supply unit of claim 2, wherein the second correction unit increases the reference voltage as the output current becomes larger.

8. The power supply unit of claim 1, wherein the output unit comprises an output transistor connected between an application terminal of the input voltage and an output terminal of the first output voltage, and drives the output transistor based on an instruction from the controller to generate the first output voltage from the input voltage.

9. The power supply unit of claim 8, wherein when an error protection signal is received from outside the power supply unit, the controller forcibly turns off the output transistor.

10. The power supply unit of claim 8, further comprising an error detection unit configured to detect an error of the power supply unit to generate an error detection signal and output the error detection signal outside the power supply unit.

11. The power supply unit of claim 10, wherein the error detection unit outputs the error detection signal to the controller, and when the controller receives the error detection signal from the error detection unit, the controller forcibly turns off the output transistor.

12. The power supply unit of claim 1, wherein the host device, the cable, and the client device are all based on a USB standard.

13. The power supply unit of claim 1, wherein the controller comprises:
- an error amplifier configured to amplify a difference between a predetermined reference voltage and a lower value of a first feedback voltage depending on the first output voltage and a second feedback voltage depending on the second output voltage to generate an error signal;
- an operation amplifier configured to amplify a voltage depending on the output current to generate a correction signal;
- an adder configured to add the error signal and the correction signal to generate an added signal; and
- a control signal generation unit configured to generate a control signal of the output unit based on the added signal.

14. The power supply unit of claim 1, wherein the controller comprises:
- an operational amplifier configured to amplify a voltage depending on the output current to generate a correction signal;
- a reference voltage generation unit configured to generate a reference voltage based on the correction signal and a second feedback voltage depending on the second output voltage;
- an error amplifier configured to amplify a difference between a first feedback voltage depending on the first output voltage and the reference voltage to generate an error signal; and
- a control signal generation unit configured to generate a control signal of the output unit based on the error signal.

15. The power supply unit of claim 14, wherein the controller is further configured to increase the reference voltage as the second feedback voltage becomes lower.

16. The power supply unit of claim 14, wherein the controller is further configured to increase the reference voltage as the correction signal becomes larger.

* * * * *